(12) United States Patent
Horacek

(10) Patent No.: US 6,189,906 B1
(45) Date of Patent: Feb. 20, 2001

(54) WHEELCHAIR HAVING A SINGLE TUBE BEND

(75) Inventor: Gregor Horacek, Ransbach-Baumbach (DE)

(73) Assignee: Otto Bock Orthopaedische Industrie Besitz-und Verwaltungs-Kommanditgesellschaft, Duderstadt (DE)

( * ) Notice: Under 35 U.S.C. 154(b), the term of this patent shall be extended for 0 days.

(21) Appl. No.: 09/258,404

(22) Filed: Feb. 26, 1999

(30) Foreign Application Priority Data

Feb. 27, 1998 (DE) ............................................... 198 08 300

(51) Int. Cl.[7] ................................................... B62M 1/14
(52) U.S. Cl. .................................... 280/250.1; 280/304.1; 403/205; 16/19; 16/29; 16/30
(58) Field of Search ............................ 280/250.1, 304.1, 280/647, 650, 47.38, 79.2; 297/DIG. 4; 16/29, 30, 18 R, 19; 403/205

(56) References Cited

U.S. PATENT DOCUMENTS

| | | | |
|---|---|---|---|
| 4,405,142 | * | 9/1983 | Whetstine ........................ 280/250.1 |
| 4,721,321 | * | 1/1988 | Haury et al. ...................... 280/250.1 |
| 4,981,305 | * | 1/1991 | Lockard et al. .................. 280/250.1 |
| 5,409,247 | * | 4/1995 | Robertson et al. ............... 280/250.1 |
| 5,560,627 | * | 10/1996 | Zatulovsky et al. ................ 280/647 |
| 5,590,893 | * | 1/1997 | Robinson et al. ................ 280/250.1 |
| 5,593,173 | * | 1/1997 | Williamson .......................... 280/650 |
| 5,871,286 | * | 2/1999 | Kern et al. ............................ 384/280 |

* cited by examiner

Primary Examiner—Lanna Mai
Assistant Examiner—Ruth Ilan
(74) Attorney, Agent, or Firm—Foley & Lardner

(57) ABSTRACT

The invention relates to a wheelchair having side frames including tube sections having a tube-bend at the front bottom end of each in an area proximate to where a bearing housing is mounted. The bearing housing has an approximately vertical bearing bore for accommodating an upwardly directed axle pin of a steering fork for holding a caster. The bearing housing also has an adjustment device, which is integrated in the screw mounting, for adjusting the bearing housing with respect to the side frame in order to align the bearing bore perpendicular to the ground. The bearing housing is mounted to the tube-bend via a guide passage of a clamping shell, which is correspondingly curved and is open on one side. The clamping shell is fitted laterally to the tube-bend and, is displaceably guided and is fixable in the desired position by tightening at least one clamping screw.

23 Claims, 5 Drawing Sheets

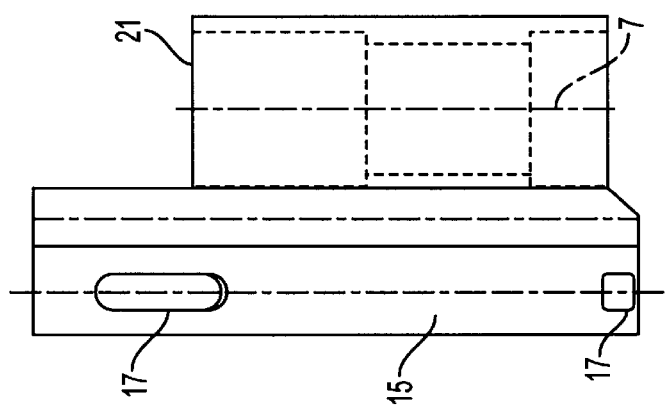
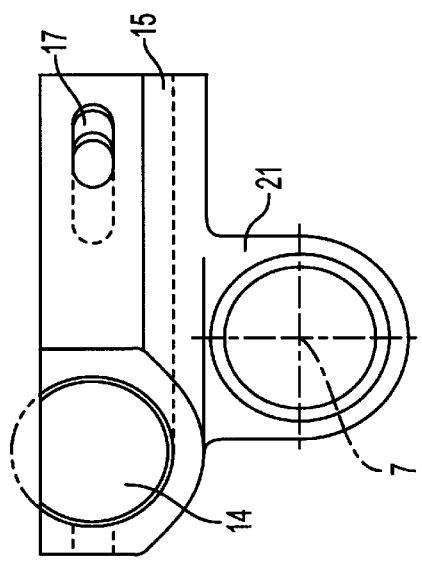
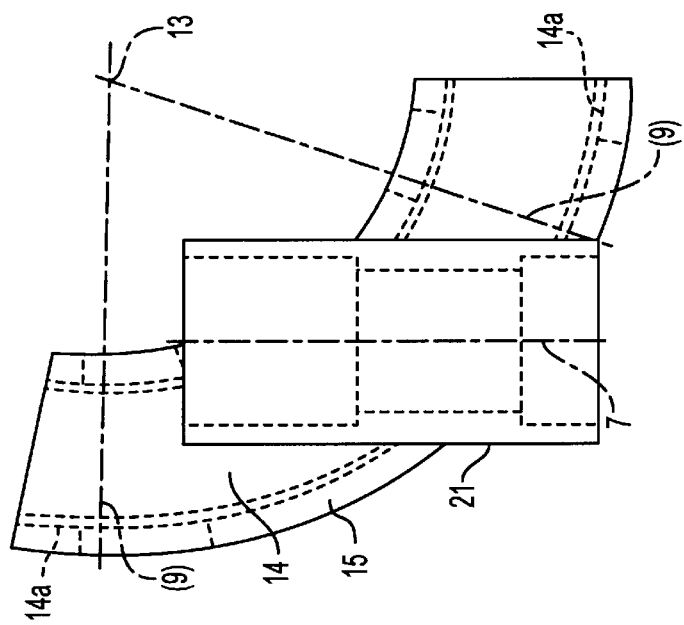

WHEELCHAIR HAVING A SINGLE TUBE BEND

SUMMARY OF THE INVENTION

1. Field of the Invention

The invention relates to a wheelchair having side frames, more particularly, to a wheel chair having side frames that include tube sections, which have a bearing housing screwed onto the front bottom end of each via a screw mounting. The bearing housing has an approximately vertical bearing bore for accommodating an upwardly directed axle pin of a steering fork for holding a caster. The wheelchair also has an adjustment device, which is integrated in the screw mounting, for adjusting the bearing housing with respect to the side frame so that the bearing bore can be aligned perpendicular to the ground.

2. Description of Related Art

One known embodiment is illustrated in FIGS. 1a and 1b. These wheelchairs, which are usually hand-operated, usually have front casters. A trailing action in a steering fork, which holds the caster, ensures stable and straight movement in a forward direction. Each steering fork is mounted in a bearing housing, which is screwed to the wheelchair side frame. An axle pin, which is connected to the steering fork and is directed vertically upward, is guided in two deep-groove ball bearings of the bearing housing, which are spaced apart from one another.

With this wheelchair, it is very important for the axle pin always to be aligned vertically with respect to the; ground to ensure wobble-free forward movement and to ensure that the wheelchair will turn without difficulty. To accomplish this, each steering-fork bearing housing is usually designed in such a manner that they can be rotated on the side frame at their attachment points irrespective of a seat tilt (the incline of the wheelchair frame to the rear by means of an appropriate height offset from rear wheels to front wheels).

One of these known solutions is illustrated in FIGS. 1a and 1b in which the steering-fork bearing housing is attached to the front vertical tube section of the side frame and can be pivoted about a horizontal axis of rotation with respect to the side frame. This rotation with respect to the side frame is effected by displacing eccentric sliding blocks (not illustrated). Then, when the bearing housing is in the desired position, the steering-fork bearing housing is fixed by tightening the clamping screws.

There are additional known ways of attaching the steering-fork bearing housings to the bottom horizontal tube section of the side frame, which comprise displacing eccentric sliding blocks or rotating an eccentric disk.

The following difficulties are encountered in all of the aforementioned known devices. First, each wheelchair has a load lever which corresponds to the distance between the contact point of the caster and the pivot axis for the bearing adjustment. The side frame and steering-fork bearing housing are subjected to considerable loads near the attachment points by an additional torque. As a result, the screw connections have to be produced with a high tightening torque. In order to prevent plastic deformation, it is necessary in turn for the frame tubes—at least in the case of an aluminum structure—to be reinforced in this area by thick-walled tube sections which are pushed in. This is complex and costintensive and increases the weight.

As a result of the aforementioned loads, the steering-fork bearing housings are usually made from extruded aluminum sections. Relatively expensive machining is required to cut these sections to the correct length and to produce the bores, bearing seats and screw threads. It is not possible to produce the sections from plastic because of the. aforementioned high load levels.

For the bearing housings to be attached in a correctly functioning manner, it is necessary for the front bottom region of each wheelchair side to be constructed, as much as possible, at a right-angle. This is usually achieved by welding two straight tube sections together at a right angle. Welding, however, is the most expensive process in producing a wheelchair.

It is not possible to use a tube-bend part for at least two reasons. First, the steering-fork bearing housing would have to be attached above the tube bend, which is too high and would result in the steering fork and tube bend colliding with one another. Second, the steering-fork bearing housing would have to be attached to the bottom horizontal tube section, behind the tube bend, which would result in the caster being positioned too far to the rear. As a result, there is a risk that the wheelchair would tip forward or the caster and the rear wheel would interfere with each other.

The difficulties suggested in the preceding are not intended to be exhaustive, but are among many which tend to reduce the effectiveness of wheelchairs. Other noteworthy problems may also exist; however, those presented above should be sufficient to demonstrate that such methods and apparatuses appearing in the past will admit to worthwhile improvement.

SUMMARY OF THE INVENTION

Accordingly, it is therefore a general object of the invention to provide a wheelchair which will obviate or minimize difficulties of the type previously described.

It is a specific object of the invention to provide a wheelchair that has a tube-bend assembly at the bottom front end of each of its side frames.

It is another object of the invention to provide a steering-fork mounting that is adjustable in such a manner as to avoid the drawbacks cited above.

It is still another object of the invention to reduce the load levers acting on the side frames of a wheelchair having greatly reduced load levers.

It is a further object of the invention to provide a side frame for a wheelchair that eliminates the need to weld the front bottom end.

It is yet a further object of the invention to provide a lighter side frame for a wheelchair.

It is still a further object of the invention to reduce the cost of producing a wheelchair.

A preferred embodiment of the invention which is intended to accomplish at least some of the foregoing objects includes a front vertical tube and a bottom horizontal tube connected by a tube-bend portion; a bearing housing mounted to the tube-bend portion; and a fastener for fastening the bearing housing to the tube-bend portion.

Additional objects and advantages of the invention will be set forth in the following description and, in part, will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

FIG. 5 is a side view, in accordance with FIG. 2, of the steering-fork bearing housing on an enlarged scale;

FIG. 6 is a plan view of the illustration in accordance with FIG. 5;

FIG. 7 is a front view of the illustration in accordance with FIG. 5;

DETAILED DESCRIPTION OF THE PREFERRED EMBODIMENTS

Figure 1B:
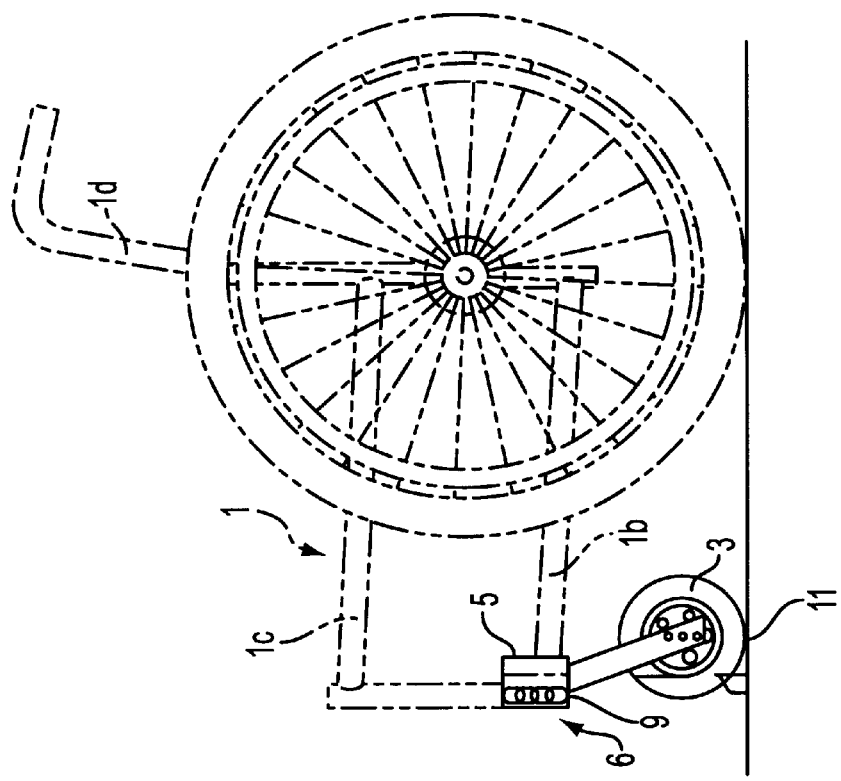
FIGS. 1a and 1b are side views of the a known wheelchair.

A preferred embodiment according to the invention comprises a side frame that, at its front bottom end, is formed as a tube-bend in the region of the bearing housing attached thereto. The bearing housing of a clamping shell is attached laterally to the tube bend via a guide passage, which is curved in a manner corresponding to the curve of the tubes forming the side frame and is open on one side. The bearing housing is displaceably guided and is fixable in the desired position by tightening at least one clamping screw, fastener, or any other clamping device. As a result, there is no weld seam on the side frame, because the front vertical section and the bottom horizontal side-frame section are formed by a single tube-bend part which, in its tube bend, accommodates the steering-fork bearing housing.

The bearing housing and the clamping shell can be produced as a single plastic part via injection-molding (e.g. from PA610Gv Material). This process is both inexpensive and does not require further machining.

It is preferable if the clamping shell is clipped onto the tube end and, by way of the guide passage, engages the circumference of the tube over more than 180°. The result is a form-fitting connection to the tube bend over a large surface area.

Furthermore, it is preferable if the at least one clamping screw is fitted through a radial bore in the tube bend and is guided in slots in the clamping shell. The pressure of the screw connections results in a force-fitting connection over a large surface area so that the screw connections are essentially only under tensile load. The bores in the tube bend continue to be free from a load. The areas around the slots in the clamping shell are essentially only under compressive load. The form fit essentially prevents the bearing housing from moving laterally or detaching from the tube-bend. At the same time, the force fit secures the bearing housing from displacement along the tube-bend.

It is also preferable for the tube-bend to be covered as completely as possible by the clamping shell to produce a large contact surface area. It is also preferable for the slots to be spaced as far apart as is possible.

To prevent blocking of the bearing housing displacement, the two ends of the guide passage preferably each have a straight mouthpiece.

To produce an optimum form-fit and force-fit, it is preferable for the bores and the slots to lie in the plane of symmetry of the side frame.

To achieve an optimum position with regard to stability and sufficient clearance for the caster with respect to the footrest, which is customarily provided, it is preferable if the bearing axis of the bearing bore is offset by about 20 mm to the rear with respect to the tube axis of the front vertical section of the side frame.

If a steering fork is designed such that it has a trailing action, then it is preferable that the contact point of the caster, together with the center of the circle for the bearing housing adjustment, forms a negative load lever. This is advantageous when the wheelchair is moving, because the direction of force runs at an angle from the bottom at the front to the top at the rear.

Figure 1A:
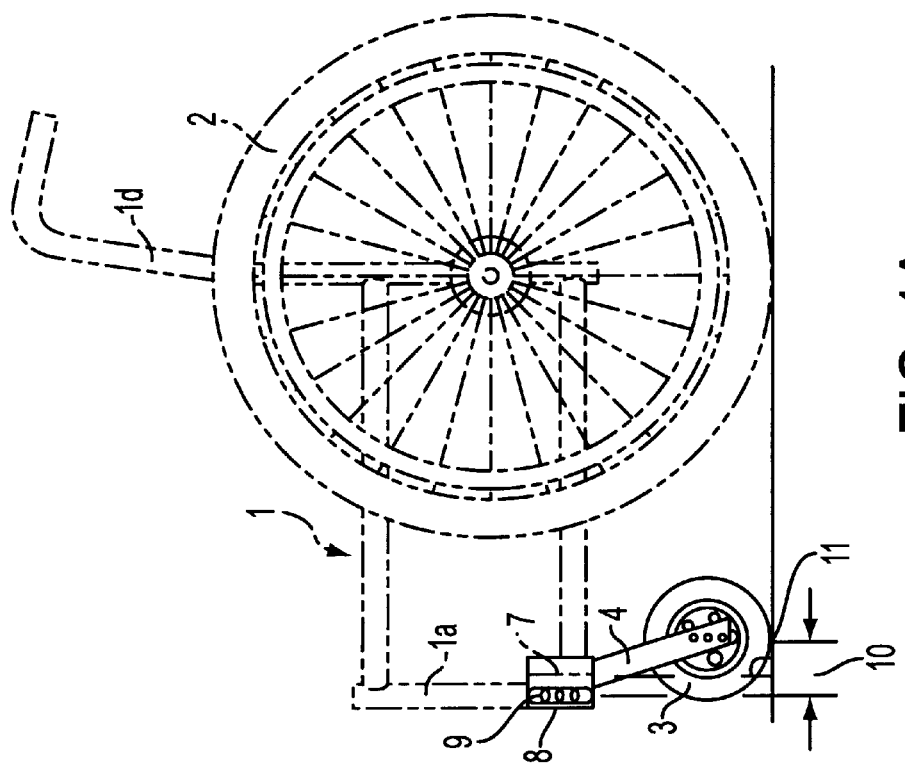

Referring now to the drawings, wherein like numerals indicate like parts, and initially to FIGS. 1a and 1b, there will be seen a known wheelchair having a horizontally aligned side frame 1, which is welded together from tube sections 1a, 1b, 1c and 1d. A rear wheel 2 is mounted on the rear tube section 1d. A front caster 3, which is guided in a steering fork 4, is mounted on the side frame 1. The steering fork 4 is guided by an axle pin (not shown in detail) and is directed vertically upward in a vertical bearing bore in two deep-groove ball bearings of a bearing housing 5 (not illustrated). The two deep-groove ball bearings are spaced apart from one another. The bearing housing 5 is fixed to the front vertical tube section 1a of the side frame 1 by a screw mounting 6.

A trailing action in the steering fork 4 ensures that the wheelchair moves forward in a stable and straight manner. It is particularly important, to ensure that the wheelchair moves forward without wobbling and turns without problems, for the axle pin or the bearing housing 5, which accommodates the axle pin, to be aligned with its bearing bore 7 always perpendicular to the ground. To accomplish this, an adjustment device which allows adjustment of the bearing housing 5 with respect to the side frame 1 is integrated in the screw mounting 6. In the known embodiment illustrated, the bearing housing 5 can be pivoted about a horizontal axis of rotation 8 within a vertical plane and can be fixed in the desired position by tightening two clamping screws 9.

In the known embodiment illustrated in FIG. 1a, the axis of the bearing bore 7 is perpendicular to the ground. If the seat is tilted, i.e., if the wheelchair frame is inclined to the rear by an appropriate vertical offset of the rear wheels 2 with respect to the front casters 3 (FIG. 1b), the bearing housing 5 is readjusted in the manner described above to maintain the perpendicular alignment of the bearing bore 7 with respect to the ground.

FIG. 1a shows a load lever 10 that results from the separation between the contact point 11 of the caster 3 and the axis of rotation 8 of the pivotable bearing housing 5. As a result of this load lever, the side frames 1 and the bearing housings 5 are subjected to considerable load, in the form of an additional torque, in the attachment area.

Figure 2:
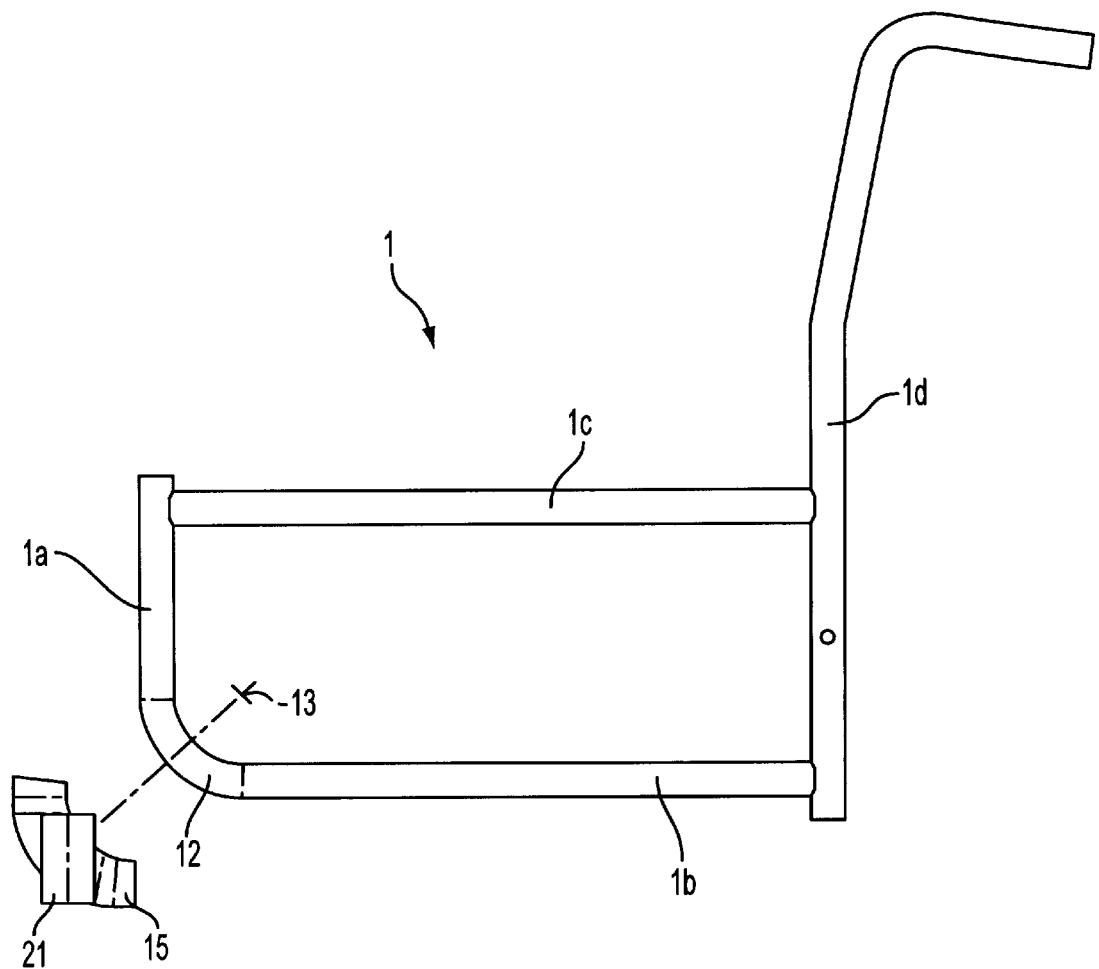
FIG. 2 is a side view of a side frame, which is designed according to the invention, for a wheelchair and, in an exploded view, a steering-fork bearing housing.
Figure 4:
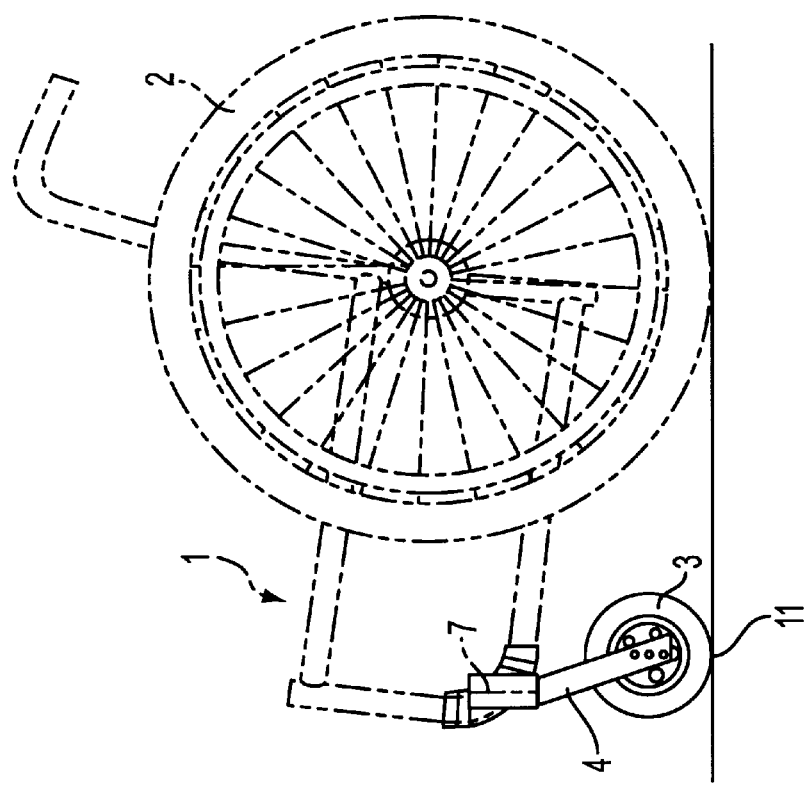
FIG. 4 is a wheelchair in accordance with FIG. 3 with the wheelchair frame inclined toward the rear.

According to a preferred embodiment of the invention, the side frame 1, which is illustrated in FIG. 2, has a tube-bend 12 at its front bottom end in the region of the bearing housing 21. The bearing housing 21 is subsequently attached to the tube-bend 12 as explained below. The center of the tube-bend 12 arc is denoted by reference numeral 13. According to the invention, a single tube-bend part is provided instead of the right-angled weld between the two tube sections 1a, 1b, which is illustrated in FIGS. 1a and 1b. As a result, there is no weld seam.

As shown in FIGS. 5 to 7, the bearing housing 21 includes a guide passage 14 (which is bent in a manner corresponding to the tube bend 12 and is open on one side) of a clamping shell 15. The bearing housing 21 is fitted laterally onto the tube-bend 12. The bearing housing 21 is displaceable along the axis of the tube-bend 12 and can be fixed in the desired position by tightening two clamping screws 9.

As shown in FIGS. 6 to 10, preferably, the bearing housing 21 and the clamping shell 15 are formed integrally as a single plastic part. The clamping shell 15 is clipped onto the tube-bend 12 and, by way of guide passage 14, engaged around the circumference of the tube-bend 12 over more than 180°. To prevent blocking during displacement of the bearing housing 5, the two ends of the guide passage 14 each have a straight mouthpiece 14a.

Each clamping screw 9 is fitted through a radial bore 16 in the tube-bend 12 and is guided in a slot 17 in the clamping shell 15. The two clamping screws 9 are spaced as far apart from one another as possible. Each bore 16 and slot 17 lies in the plane of symmetry of the side frame 1.

The bearing housing 21 is designed such that the bearing axis of its bearing bore 7 is offset by about 20 mm to the rear with respect to the tube axis of the front vertical section 1a of the side frame 1.

Figure 3:
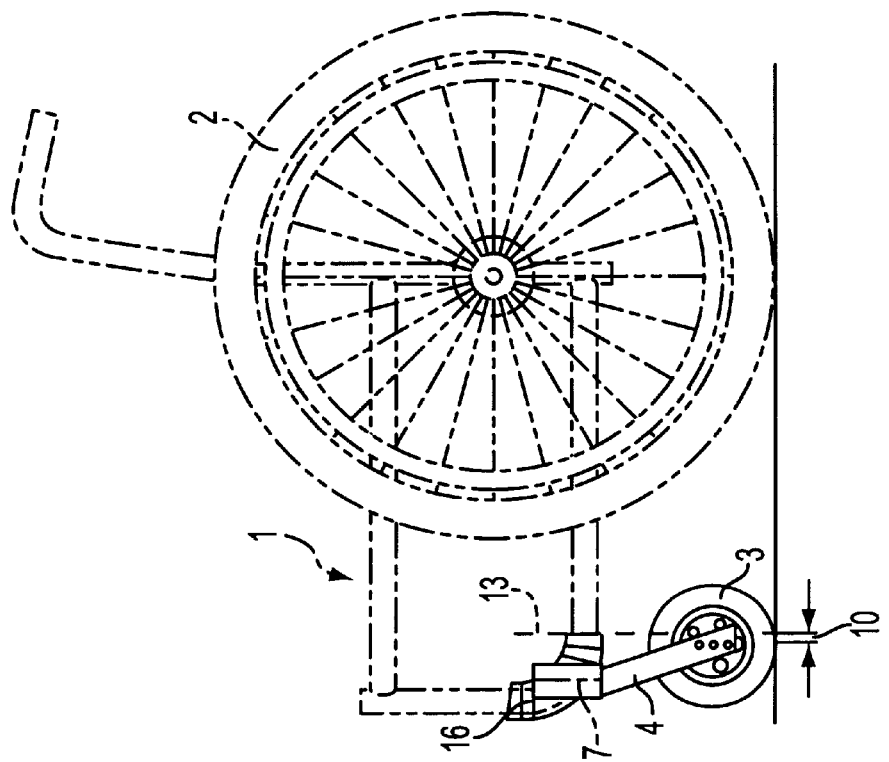
FIG. 3 is a wheelchair which is fitted with the side frame in accordance with FIG. 2.
Figure 10:
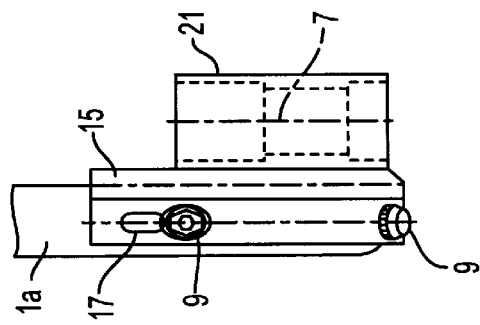
FIG. 10 is a front view of the mounted steering-fork bearing housing.
Figure 9:
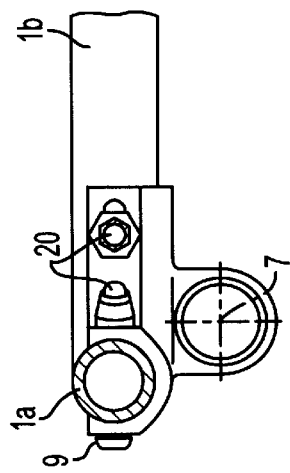
FIG. 9 is a plan view of the steering-fork bearing housing which is mounted on the tube bend, with a horizontal section through the vertical tube section.

FIG. 3 shows that the contact point 11 of the caster 3, together with the circle center 13 for the bearing housing adjustment, forms a negative load lever 10.

Figure 8:
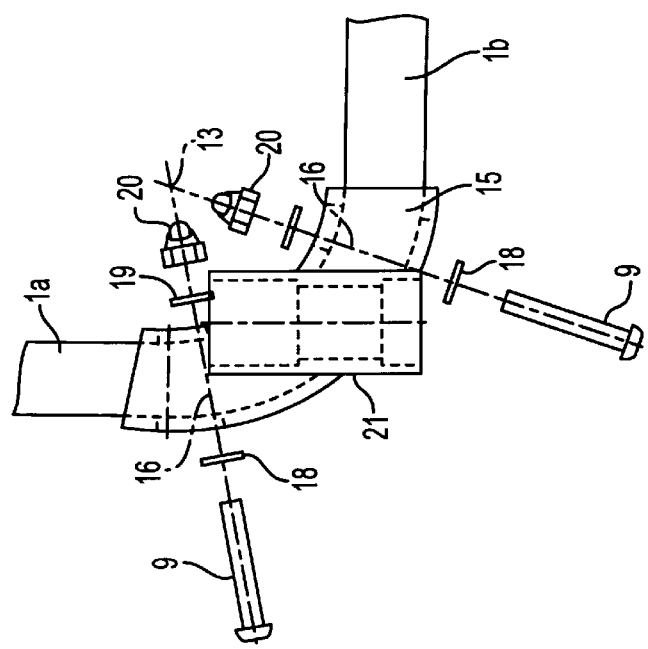
FIG. 8 is an exploded view of the steering-fork bearing housing, in accordance with FIG. 5, resting on a tube bend.

FIG. 8 shows the tube-bend 12 with its circle center 13 and bores 16. The clamping screws are inserted thorough bores 16 and slots 17 and then washers 18, 19 are fitted onto the screw on each side of the clamping shell 15, and then cap nuts 20 are screwed onto the clamping screws 9.

Additional advantages and modifications will readily occur to those skilled in the art. Therefore, the invention in its broader aspects is not limited to the specific details, and representative devices, shown and described herein. For example, any known type of clamping mechanism can be used to secure the clamping shell to the tube-bend, and obviously, the clamping shell can have many different configurations that that are suitable for performing the abovedescribed function. Moreover, the tube-bend can have a cross-section of any known shape that is strong enough to support the wheelchair and its occupant. Accordingly, various modifications may be made without departing from the spirit or scope of the general inventive concept as defined by the appended claims and their equivalents.

Foreign priority document, DE 198 08 300.4, filed Feb. 27, 1998 and published Sept. 9, 1999, is hereby incorporated by reference.

What is claimed is:

1. A wheelchair comprising:

two side frames, wherein each side frame has a front tube section and a bottom tube section, both sections being connected at a bottom front end by a tube-bend portion defining a circle center;

a bearing housing mounted to each tube-bend portion and comprising a bearing bore for accommodating an upwardly directed axle pin of a steering fork for holding a caster, each bearing housing being displaceable on and along a curve defined by the respective tube-bend portion to align the bearing bore perpendicular to the ground; and at least one fastener for fastening each bearing housing to the respective tube-bend portion.

2. A wheelchair as claimed in claim 1, further comprising a clamping shell mounted to said bearing housing, wherein the clamping shell has a guide passage for mounting to said tube-bend portion.

3. A wheelchair as claimed in claim 2, wherein the clamping shell and the bearing housing are formed as a single integral unit.

4. A wheelchair as claimed in claim 3, wherein the clamping shell and the bearing housing are comprised of a synthetic resin.

5. A wheelchair as claimed in claim 2, wherein the guide passage is open on one side and is curved such that an inner surface of the guide passage corresponds to an outer surface of the tube-bend portion.

6. A wheelchair as claimed in claim 2, wherein the guide passage engages a circumference of the tube-bend portion over more than 180 degrees.

7. A wheelchair as claimed in claim 2, wherein each guide passage has a substantially straight mouthpiece at each end.

8. A wheelchair as claimed in 2, wherein the fastener comprises a clamping screw.

9. A wheelchair as claimed in claim 8, wherein the clamping screw is guided through a hole in the tube-bend.

10. A wheelchair as claimed in claim 9, wherein the clamping screw is guided through a slot in the clamping shell.

11. A wheelchair as claimed in claim 9, wherein the hole in each tube-bend portion is aligned radially with respect to the circle center of the respective tube-bend portion.

12. A wheelchair as claimed in claim 1, wherein an axis of the bearing bore is offset approximately 20 mm rearward from an axis of the front tube section of the respective side frame.

13. A wheelchair as claimed in claim 1, wherein, when the steering fork is designed for a positive caster, the contact point of the caster, together with the circle center defined by the tube-bend portion, forms a negative load lever.

14. A side frame assembly for a wheelchair, comprising:

a front vertical tube and a bottom horizontal tube connected by a tube-bend portion, the tube-bend portion defining a circle center;

a bearing housing mounted to the tube-bend portion and comprising a bearing bore for accommodating an upwardly directed axle pin of a steering fork for holding a caster, each bearing housing being displaceable on and along a curve defined by the tube-bend portion to align the bearing bore perpendicular to the ground; and a fastener for fastening the bearing housing to the tube-bend portion.

15. A side frame assembly for a wheelchair as claimed in claim 14, further comprising a clamping shell connected to the bearing housing, wherein the clamping shell has a guide passage.

16. A side frame assembly for a wheelchair as claimed in claim 15, wherein the guide passage has a curved inner surface.

17. A side frame assembly for a wheelchair as claimed in claim 16, herein the inner surface of the guide passage corresponds to an outer surface of the tube-bend portion.

18. A side frame assembly for a wheelchair as claimed in claim 15, wherein the guide passage engages a circumference of the tube-bend portion.

19. A side frame assembly for a wheelchair as claimed in claim 15, wherein the guide passage engages a circumference of the tube-bend portion over more than 180 degrees.

20. A side frame assembly for a wheelchair as claimed in claim 15, wherein the fastener includes two clamping screws, wherein each clamping screw is inserted through a radial bore in the tube-bend portion and a slot in the clamping shell.

21. A side frame assembly for a wheelchair as claimed in claim 20, wherein each bore and each slot is in a plane of symmetry of the side frame.

22. A side frame assembly for a wheelchair as claimed in claim 15, wherein an axis of the bearing bore is offset about 20 mm rearward from an axis of the front tube section of the side frame.

23. A wheelchair comprising:

two side frames, wherein each side frame has a front vertical member, a bottom horizontal member, and a tube-bend portion connecting the front vertical and the bottom horizontal members and defining a circle center;

a bearing housing mounted to each tube-bend portion and comprising a bearing bore for accommodating an upwardly directed axle pin of a steering fork for holding a caster, each bearing housing being displaceable on and along a curve defined by the respective tube-bend portion to align the bearing bore perpendicular to the ground; and means for fastening each bearing housing to the respective tube-bend portion.

\* \* \* \* \*